Oct. 11, 1966

W. M. BOOTH 3,277,678

REMOTELY ADJUSTABLE TRUCK MIRROR

Filed Feb. 16, 1965

INVENTOR.
WILLIAM M. BOOTH

BY

ATTORNEYS

Oct. 11, 1966  W. M. BOOTH  3,277,678
REMOTELY ADJUSTABLE TRUCK MIRROR
Filed Feb. 16, 1965  2 Sheets-Sheet 2

INVENTOR.
WILLIAM M. BOOTH
BY
ATTORNEYS

# United States Patent Office 3,277,678
Patented Oct. 11, 1966

3,277,678
REMOTELY ADJUSTABLE TRUCK MIRROR
William M. Booth, 2006 Vista Place, Grand Haven, Mich.
Filed Feb. 16, 1965, Ser. No. 433,073
3 Claims. (Cl. 74—98)

This invention relates to side-view mirrors for trucks, and more particularly to apparatus for mounting these mirrors such that they may be adjusted from a remote position within the cab of the truck.

In recent years a great many drivers of motor vehicles have become aware of and impressed with the virtues of side-view mirrors, and indeed in the rush of modern traffic conditions probably more reliance is placed upon these mirrors than is placed upon the conventional rear-view mirror within the vehicle. Truckers have for many years known and used these mirrors, however, and in many instances side-view mirrors are practically indispensable. A good example of such an instance is the backing up and positioning of large semitrailers for loading and the like, where the driver must at all times have a clear view of both sides of his trailer, including the rear corners, in order to properly control the trailer and back it into the proper position.

Trucks in general and particularly large semi-trucks present very rigorous conditions of operation and require particularly rugged and sturdy mirrors. Such trucks operate night and day and at high speeds, with heavy engine vibrations and high wind velocities in the slip stream buffeting against the mirrors tending to severely shake and vibrate the mirror upon its mounts. Further, the mirrors are given the roughest possible usage involving all weather conditions and every type of bumping and jolting terrain. Consequently, mirrors used on trucks must themselves be strongly built, and they must be mounted upon strong and rigid support arms in a securely fixed manner. As a result of these requirements, a more-or-less typical mirror has evolved over a period of years (referred to generally as the "West Coast" or "Western" type mirror) which bolts securely to a rigid structure of supporting braces, which in turn is securely bolted to the truck body.

In typical operation, many different drivers may take turns driving a single truck, and each driver is likely to have a natural driving position that is different from the others. Consequently, the rigidly bolted side-view mirrors are initially placed during installation in a position which is believed to be correct for the average driver. Since the actual drivers vary widely in physical characteristics, in most instances the drivers must adjust the position of their bodies to accommodate that of the mirror, and this produces unnatural and uncomfortable postures which exhausts the energies of the drivers in much shorter periods of time. Furthermore, even the ideal "average" driver makes many minute changes in his position during the exacting process of backing one of the large trailers into the usually narrow confines allotted to it at a typical loading dock or other such facility. When the mirror is in the wrong position to begin with for a non-average driver, the problem is aggravated and multiplied to even larger proportions, which often involves driving accidents and property losses.

As a result of the foregoing, a clear need exists for a large, rugged, and durable mirror-mounting construction which will remain properly in position without exhibiting blurring vibrations for long periods of time under very strenuous usage, but which is quickly and easily adjustable from within the truck. While a few devices have in the past been suggested for filling this need, for the most part the truckers continue to use the conventional rigidly bolted mirrors, since previous adjustable mirrors were thought to be either very difficult to actually move and adjust under true driving conditions, or they would constantly change their positions under the rigorous driving conditions to which they were constantly subjected. Furthermore, such mirrors were generally quite costly as well.

The present invention has as one of its important objectives the provision of a side-view mirror mounting construction for trucks which enviably solves the above-stated problems. A mirror mounted by this construction is completely rigid and practically immovable by exterior forces, and yet it is very easily adjusted from within the truck. The mirror furthermore is smoothly and easily adjusted by even the smallest of increments to desired new positions, so that the driver may if he desires actually change the adjustment of his mirror during the operation of backing his trailer into a closely confined parking space.

Another important objective of this invention is to provide side-view mirror mounting apparatus having all of the features just noted by which the conventional rigidly-bolted mirrors may be remounted upon their own support arms so as to make them fully adjustable, thereby obviating the necessity of buying an entirely new adjustable mirror and support structure.

Still another object of the present invention is to provide mirror-mounting structure which makes available all of the foregoing features within a single structure which may be used on either side or in any position upon a truck.

A still further object of the present invention is to provide mirror-mounting structure having the features noted which has great observational flexibility and whose adjustment may be accomplished through a number of different driving forces.

Still another object of this invention is to provide mounting apparatus for side-view mirrors which provides all of the foregoing objects, which is itself very durable and strong and which will operate practically indefinitely without care.

These and other objects, together with many advantages resulting from the use of this invention, will become increasingly apparent upon a full consideration of the ensuing specification and its appended claims, especially when taken in conjunction with the accompanying illustrative drawings setting forth a preferred embodiment thereof.

Stated in very brief terms, the present invention provides structure for either remounting presently existing side-view truck mirrors, or for mounting such mirrors in the first instance, in a manner making them readily adjustable from within the truck. This structure includes basically a pair of mounting brackets which each attach to the mirror itself and also to the previous mirror support arms, so that the brackets are firmly and rigidly secured in place. One of the brackets of this invention includes bearing-forming means for receiving the bolts or studs by which the mirror is mounted at one of its ends, while the other bracket includes a similar bearing-forming means for the other end of the mirror which further is secured to a first gearing means. This is preferably a segment of a worm wheel, and it is substantially enclosed within the interior of the bracket. A worm is also enclosed within the bracket, and is mated to the worm wheel in a manner by which rotation of the worm moves the wheel segment and causes the mirror to rotate upon the two bearing means mentioned. Means for driving the worm are introduced into the interior of the bracket. This is preferably a flexible torsion drive shaft or cable, and its other end is brought into the cab of the truck where it is mounted in a desired position and coupled with a desired means for rotatably driving the shaft or cable, such as a manual crank, or other manual or automatic power means.

Figure 1:
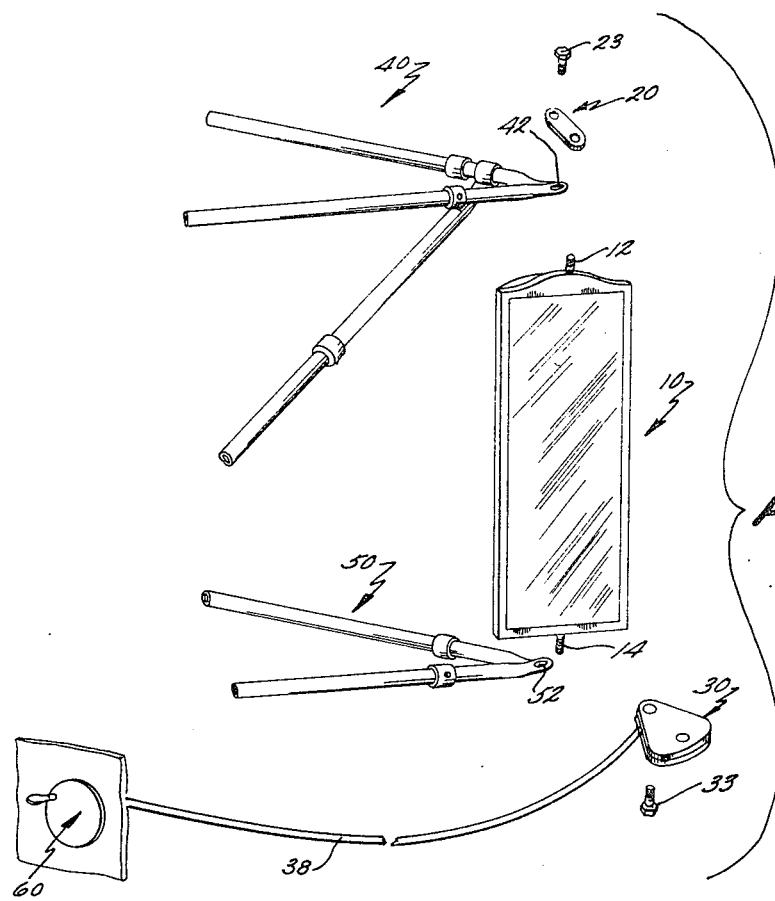
FIG. 1 is an exploded perspective view, partially in cut-away, showing a typical mirror-supporting structure and the manner in which the present invention may be used therewith.

Referring now in more detail to the drawings, in FIG. 1 a typical sturdy side-view truck mirror 10 is shown, together with my novel adjustable support brackets 20 and 30 and a typical pair of supporting arms 40 and 50, upon which the mirror 10 was previously rigidly mounted. The mirror itself is generally a large rectangular one approximately six by fifteen inches, and it has a pair of mounting studs 12 and 14 protruding from each end at about the center of the mirror. The studs 12 and 14 (or equivalent tapped and threaded holes for receiving external studs or bolts) are rigidly fastened to the mirror during its manufacture, and the mirror is originally secured to supporting arms 40 and 50 by inserting the two studs through appropriate bolting holes 42 and 52, respectively, formed at the end of each of the support arms. Suitable nuts (not shown) are then tightened down upon the studs and against the arms, so as to secure the mirror rigidly in place. As may be noted from the drawings, the support arms 40 and 50 are strong members preferably made from a tubular stock and having suitable cross bracing and the like for obtaining the necessary rigidity.

Figure 2:
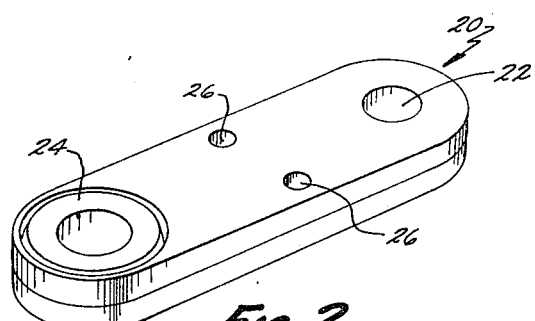
FIG. 2 is a perspective view of one of the main components of this invention.

In FIG. 2 the top support bracket 20 is shown in greater detail. It may there be seen that this support is basically an oblong member having rounded ends. Generally centrally of one end is an aperture 22 which passes completely through the bracket, for the purpose of receiving a mounting bolt such as that shown at 23 in FIG. 1. Generally centrally of the other end of the bracket is located a bearing 24. This is preferably a spherical bearing, so as to be self-centering within the aperture in the bracket 20 which receives and retains it. When the bearing 24 is of the preferred spherical configuration, provision must be made for mounting it in the bracket 20 from the inside, and I accomplish this by forming the bracket in two complementary halves which, after the bearing has been inserted properly, are retained together by the screws 26, which pass through holes formed in the upper half of the bracket and thread into tapped holes formed in the bottom half thereof.

Figure 3:
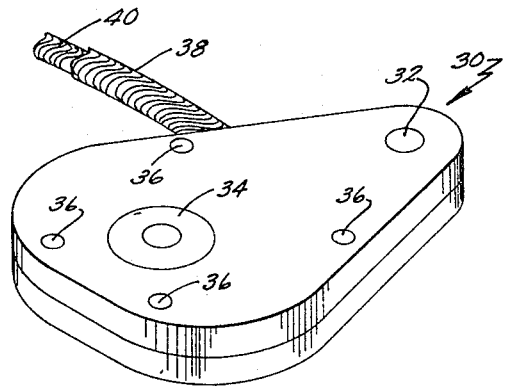
FIG. 3 is a perspective view, partially in cut-away, showing the other main component of the present invention.

The configuration of the lower adjustable support bracket 30 of FIG. 1 is more clearly shown in FIG. 3, where it is seen that like the top bracket, this one is also oblong, but unlike the top one it is considerably wider at one end than at the other. The lower bracket 30 has an aperture 32 formed generally centrally of its narrower end and passing completely through same, for receiving mounting means such as the bolt 33 of FIG. 1 or the like. At its other end, a bearing 34 is located which provides for rotary movement within the aperture in bracket 30 in which it rests and is retained. The lower bracket 30 is also formed from two basically flat, generally symmetrical halves which are secured together by screws 36 which pass through holes formed in one of the halves and thread into tapped holes formed in the other half.

Figure 4:
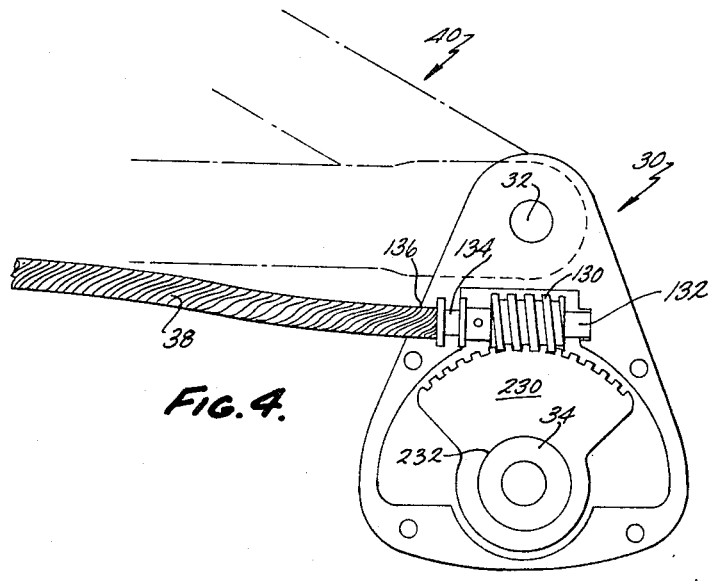
FIG. 4 is a plan view of the interior portion of the component of FIG. 3, the top half thereof being removed to show details.

In FIG. 4 the bracket 30 is shown in further detail, the upper one of its two halves being removed in order to show the interior structure. The interior of each half of the bracket 30 is relieved in two areas to provide access for a worm 130 and a worm wheel 230, which preferably is a quarter-segment of a complete wheel, since a segment of this size is entirely adequate for the purpose to be served. The relieved portions within bracket 30 are preferably formed so as to provide journals for the worm 130 at each of its ends 132 and 134, and the bracket further includes a cylindrical passage 136 continuing outward from the journal at 134 through the side of the bracket.

The means by which the worm 130 is driven is introduced into the bracket 30 through passageway 136. Such means preferably comprises a flexible torsion cable having an outer protective harness therefore, shown at 38. The flexible drive cable itself is illustrated in the drawings (FIG. 4) at the journal point 134, where it connects to the worm 130, and is identified by numeral 40. By such a drive means, it will be apparent that a remote mechanism for supplying turning motion to the flexible cable 40 will readily turn the worm in either direction without any rotational slippage. This remote means may simply be a hand crank (shown at 60 in FIG. 1) for the driver of the truck to operate manually, or any manner of power driving means might be used if desired.

As FIG. 4 indicates, the worm 130 and worm wheel segment 230 are engaged within bracket 30 so that rotation of the worm tends to drive the segment in either direction. Worm wheel segment 230 has an aperture formed therethrough, designated 232, and this aperture receives a bearing 34. The latter is preferably a generally cylindrical sleeve-type bearing, and the worm wheel segment 230 is secured thereto by known methods such as a snug press-fit between the two pieces. The end portions of bearing 34 extend beyond segment 230 in both directions, and the bearing ends are preferably shaped so as to be rotatably retained within receiving apertures formed in each of the halves of the bracket 30. Thus, rotation of the drive means 40 and the resultant turning of worm 130 causes wheel segment 230 to be smoothly moved in either of two directions. Since the bearing 34 is rotatably fitted to each half of bracket 30, and since segment 230 is secured to the bearing 34, as the segment is driven by the worm both it and bearing 34 move in a rotary fashion which is smooth and even due to the interaction between the bearing and the bracket.

As is well known, very great gearing reductions can be accomplished by worms and followers such as the segment here shown, and consequently a small rotary driving force applied to the worm through the cable can be very greatly multiplied by the gearing ratio between the worm and the worm wheel. This may be used to drive significant loads attached to the segment, and at the same time the mechanical advantage of such an arrangement in effect precludes any large force which might be applied through the mirror to the segment from working the system in reverse to drive the worm away from a desired position. It will immediately be appreciated that such an arrangement is of great value in the present application, since adjustment of the mirror from within the truck is effortless, and a relatively large movement of the driving means produces only a small movement of the driven means so that precise adjustments may readily be obtained. Furthermore, the large loads applied to the mirror by wind loading and the like are unable to move the mirror from its desired orientation, and further, such loads are unable to produce undesired vibrations in the mirror relative to the support arms upon which it is mounted to the truck which would tend to blur the reflected image in the mirror.

In actual operation, mirrors such as that shown at 10 in FIG. 1 which already are fixedly attached to truck bodies by supporting arms such as those shown at 40 and 50 may readily be converted to become adjustable by means of my present invention. Such mirrors generally are affixed to the supporting arms by having the studs 12 and 14 at opposite ends of the mirror pass through apertures 42 and 52 formed in the supporting arms with nuts being threaded upon the studs 12 and 14 and drawn tight against the support arms. Conversion is easily accomplished by first loosening and removing these retaining nuts, and removing the mirror from the supporting arms.

Support bracket 20 is then attached to supporting arm 40, and bracket 30 is attached to supporting arm 50, as by passing bolts such as 23 and 33, respectively, through the apertures 42 and 52 in the arms and apertures 22 and 32 in the brackets, and then firmly tightening these into place. Studs 12 and 14 of the mirror are then passed through bearings 24 and 34, respectively, in the two brackets, and finally, nuts are tightened down upon each mirror stud, drawing the same firmly against the appropriate bearing in the support bracket.

Once this has been accomplished and the desired drive means 38 mounted within the truck, the transition will have been made and the mirror will be completely adjustable. Furthermore, the complete brackets 20 and 30 operate with equal ease and facility on either side of the truck, and consequently their manufacture is significantly simplified since only one version is required. Further, owners of several trucks or a fleet of trucks will realize economies in original installations and in purchases for stock and repair as well, for the reason that they need not buy complete sets of mirrors and support apparatus, but may utilize the full life of mirrors which have already been purchased and installed.

While I have described the structural details of the embodiment of this invention most preferred by me, it will be apparent to those skilled in this art that certain modifications and variations in this structure may be made without departing from the underlying spirit of the invention. All such modifications and variations are to be considered a part of the invention unless the claims appended below by their language expressly state otherwise.

I claim:

1. In a side-view mirror assembly for use on trucks, of the type wherein a mirror element is fixedly mounted between first and second spaced supports to the cab of the truck, the improvement consisting of apparatus for mounting said mirror element in a manner making it remotely adjustable, said apparatus comprising: a first extension link fixedly securable to said first support; first rotary bearing means located in said first link a predetermined distance from the point at which such link is secured to said first support; said first bearing means being connectable to said mirror element to rotatably mount the same upon said first extension link; a second extension link fixedly securable to said second support; second rotary bearing means located in said second link substantially the same said predetermined distance from the point at which said second link is secured to said second support; said second bearing means being connectable to said mirror element to rotatably mount the same upon said second extension link; said second extension link containing and substantially wholly enclosing a force-multiplying means, consisting of a substantially irreversible gearing mechanism; said gearing mechanism being connectable to said mirror element to rotate the same upon said second bearing means; and rotary torsion drive shaft means connected to said gearing mechanism and extending to said cab to remotely drive the gearing mechanism and thereby rotate the mirror element from within said truck.

2. The improvement in mirror assemblies defined in claim 1, wherein both of said bearing means include spherically-configured bearings seated in spherically-configured sockets formed in said extension links.

3. The improvement in mirror assemblies defined in claim 1, wherein said second extension link is a relatively thin, flat member and said gearing mechanism includes a worm connected to said drive shaft means and a worm wheel meshed with said worm and coupled to said mirror element.

References Cited by the Examiner
UNITED STATES PATENTS

| | | | |
|---|---|---|---|
| 2,326,316 | 8/1943 | Allen | 88—98 X |
| 2,674,922 | 4/1954 | Robinson | 88—93 |
| 2,751,817 | 6/1956 | Lapekas | 88—93 |
| 3,075,073 | 1/1963 | Hildebrecht | 74—89 X |
| 3,075,431 | 1/1963 | White | 88—93 |
| 3,132,201 | 5/1964 | Bertell et al. | 88—98 |

References Cited by the Applicant
UNITED STATES PATENTS

| | | |
|---|---|---|
| 2,066,981 | 1/1937 | Koca. |
| 2,696,142 | 12/1954 | Langford. |
| 2,843,018 | 7/1958 | Cooper et al. |
| 2,856,817 | 10/1958 | Garden. |
| 2,877,686 | 3/1959 | Foster. |
| 2,917,972 | 12/1959 | Bonaguro. |
| 3,005,384 | 10/1961 | Baird et al. |

FRED C. MATTERN, JR., *Primary Examiner.*

BROUGHTON G. DURHAM, *Examiner.*

D. H. THIEL, *Asisstant Examiner.*